United States Patent [19]

Peters et al.

[11] Patent Number: 5,176,161
[45] Date of Patent: Jan. 5, 1993

[54] APPARATUS AND METHOD FOR CONTROLLED FLOW DISTRIBUTION

[75] Inventors: Steven W. Peters, Jasper, Ala.; John S. McCabe; John S. Andrepont, both of Naperville, Ill.

[73] Assignee: Chicago Bridge & Iron Technical Services Company, Oak Brook, Ill.

[21] Appl. No.: 800,973

[22] Filed: Dec. 2, 1991

[51] Int. Cl.⁵ ............................................. F17C 13/00
[52] U.S. Cl. ..................... 137/15; 137/590; 137/592
[58] Field of Search .................. 137/1, 15, 590, 592; 220/563

[56] References Cited

U.S. PATENT DOCUMENTS

| | | | |
|---|---|---|---|
| 4,315,404 | 2/1982 | Schmitt et al. | 60/690 |
| 4,449,368 | 5/1984 | Haynie | 60/652 |
| 4,643,212 | 2/1987 | Rothrock | 137/1 |
| 4,863,055 | 9/1989 | Bietz | 220/563 |
| 4,987,922 | 1/1991 | Andrepont et al. | 137/592 |

OTHER PUBLICATIONS

Roger L. Cole and Frank O. Bellinger "Storing Solar Energy in Thermally Stratified Tanks", pp. 2074–2079, 17th IECEC, copyright 1982 IEEE, Primary Examiner—John Rivell
Attorney, Agent, or Firm—Marshall, O'Toole, Gerstein, Murray & Bicknell

[57] ABSTRACT

An enclosed storage tank for simultaneous addition and removal, and storage, of two liquid layers of different density comprising a tank shell having a bottom, side wall and a roof and a column extending from the shell bottom to at least near the roof; a horizontal first liquid distributor spaced around and extending outwardly of the column and located in the upper part of the tank and having an upwardly facing liquid distribution surface; a low density liquid conduit extending from outside the shell into communication with the column whereby low density liquid can be fed to the column and then flow to the first liquid distributor and onto the upper liquid distribution surface; a horizontal second liquid distributor spaced around and extending outwardly of the column above which the column extends and spaced above the shell bottom; the second liquid distributor having a downwardly facing liquid distribution surface; a high density liquid conduit extending from outside the shell into communication with the column whereby high density liquid can be fed to the column and then flow to the second liquid distributor and beneath the lower liquid distribution surface and the high density liquid can be withdrawn from the tank through the high density liquid conduit while low density liquid is fed to the tank through the low density liquid conduit. The distributors include a plurality of side-by-side panels positioned so that they present a substantially horizontal, planar, flat, and smooth liquid distribution surface.

35 Claims, 5 Drawing Sheets

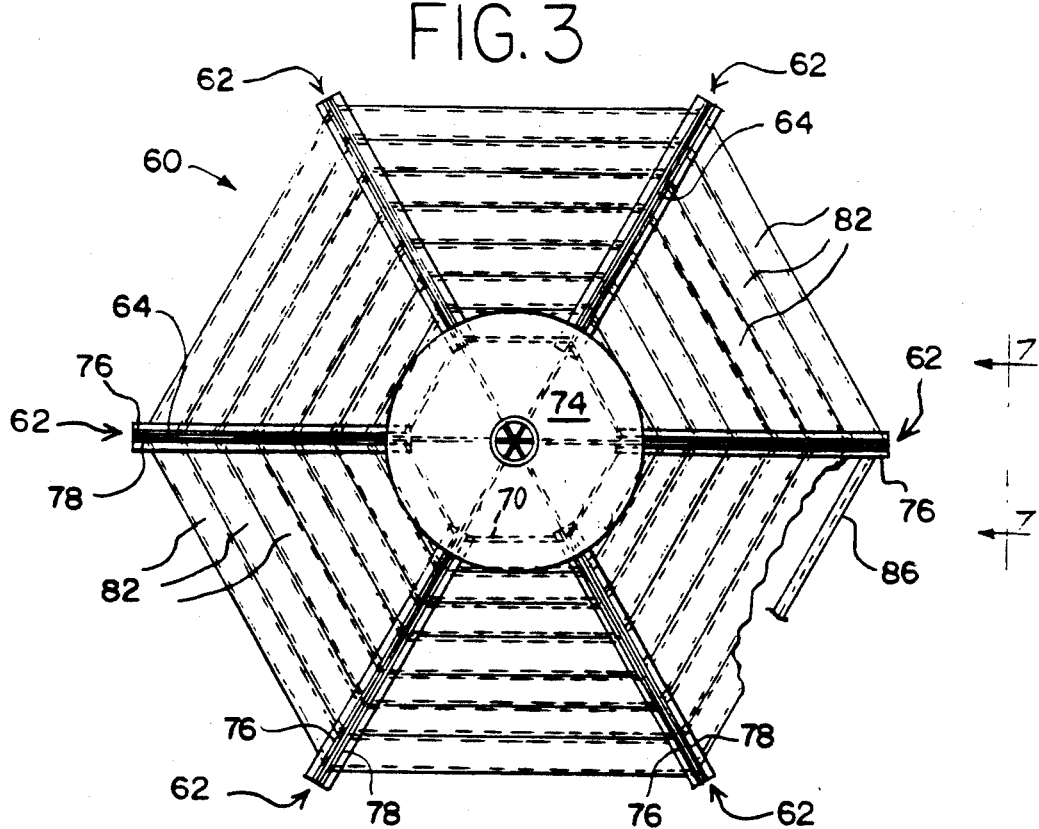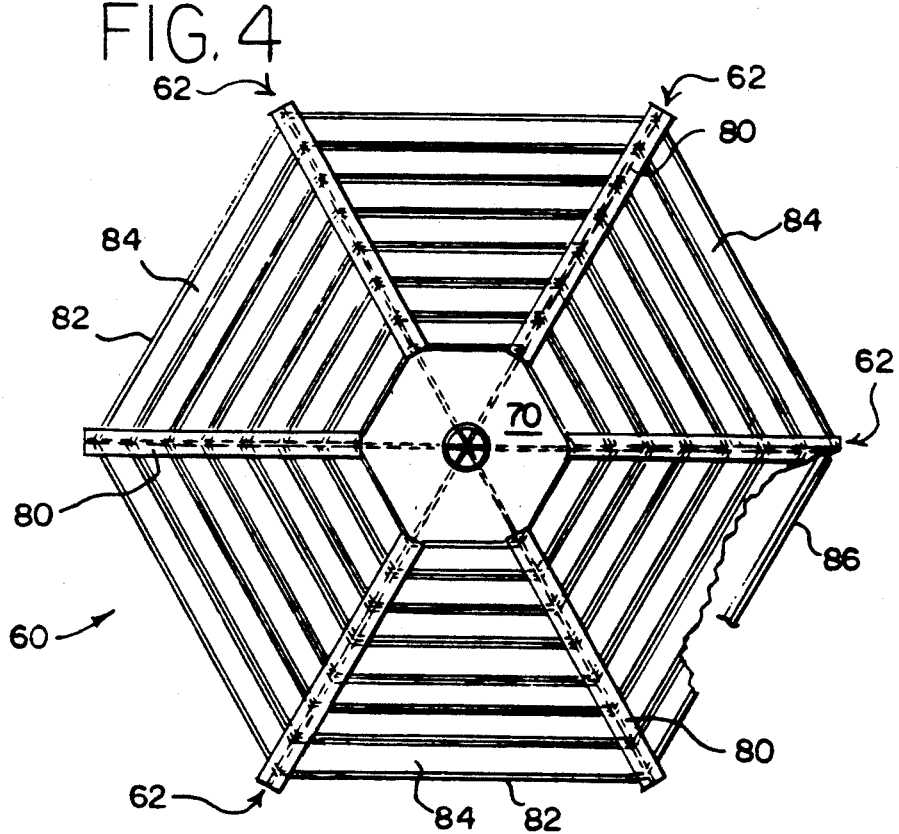

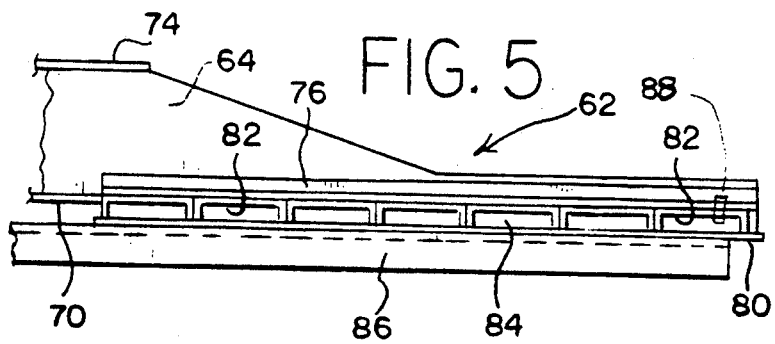
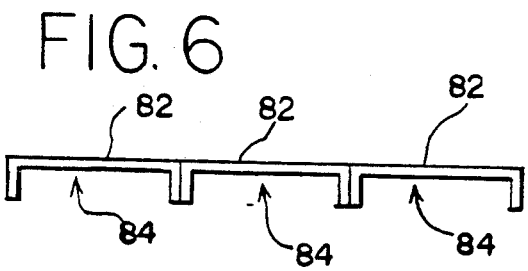
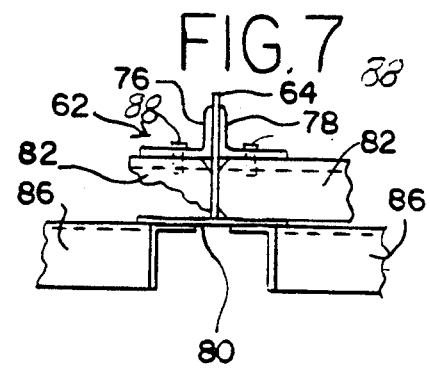
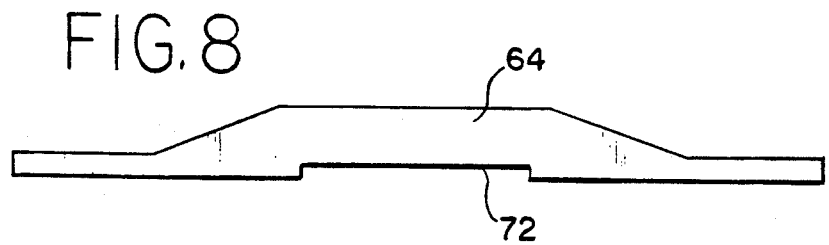
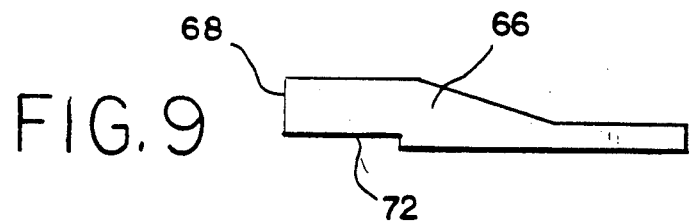
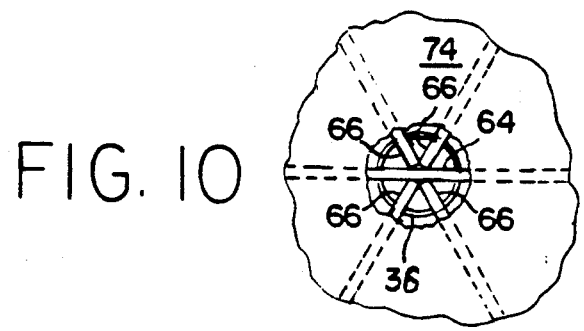

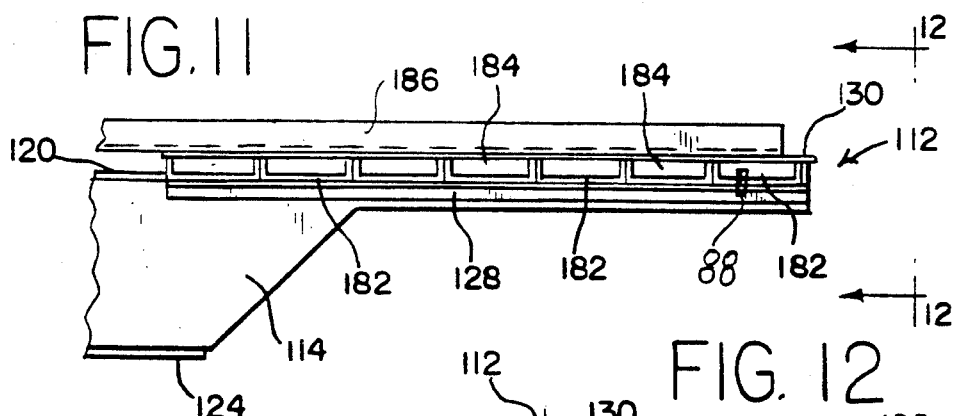
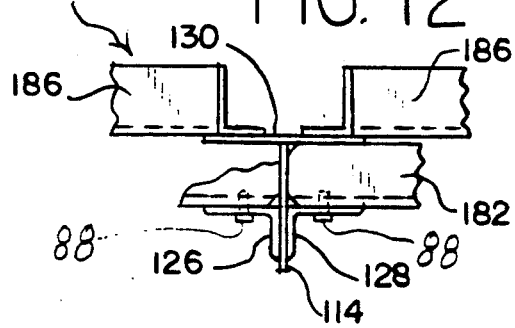
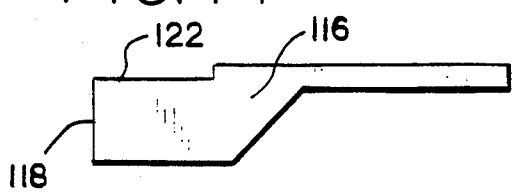
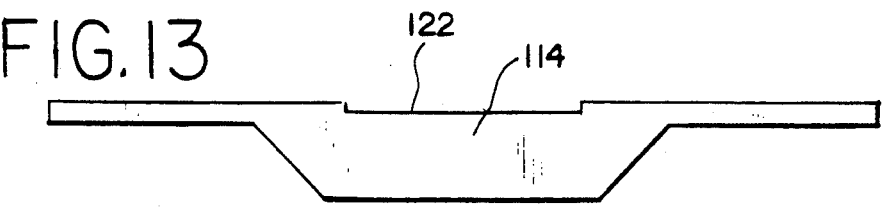
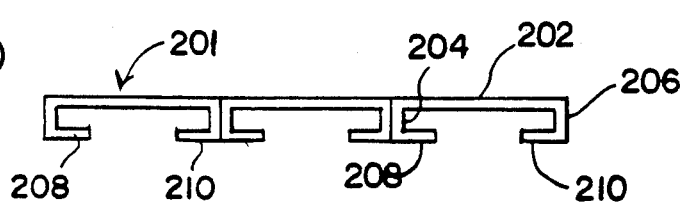
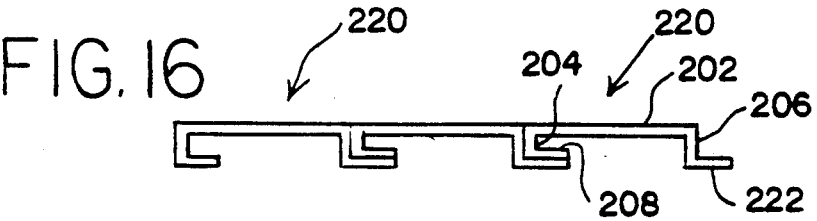
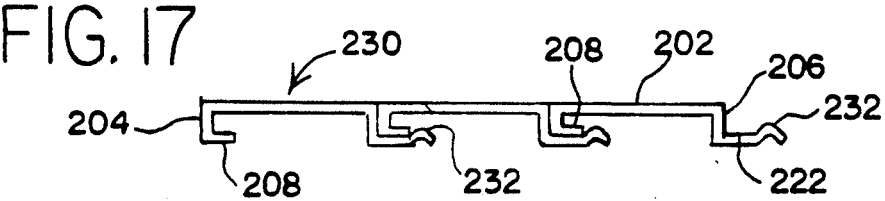

APPARATUS AND METHOD FOR CONTROLLED FLOW DISTRIBUTION

This invention relates to controlled liquid flow and distribution apparatus and methods in a liquid storage tank, and especially a tank for storing two liquids of different densities in contact with each other, and particularly with the simultaneous removal of one of the liquids from the tank while the other liquid is fed into the tank.

BACKGROUND OF THE INVENTION

It is recognized as useful to be able to store two liquids of different density under conditions which maintain them essentially separate, even when the composition of both liquids is identical. Such separation can be achieved by two independent vessels, a single vessel with internal compartmentalization, a vessel with simple or labyrinthine fixed baffles, a vessel with a movable rigid baffle or a vessel with flexible diaphragm or membrane. Such systems, however, have technical, operational or economic drawbacks.

A more desirable system is to maintain separation of the two different density liquids as separate layers by stratification with the lower density liquid layer above the higher density liquid layer. Even though the density of the two liquids is different, they have the same composition. This can occur because the density of the liquid used increases as its temperature decreases and the density decreases as its temperature increases. Examples of such liquids, at least over some of the most useful temperature ranges, are water, aqueous solutions of organic liquids such as methanol and ethylene glycol, aqueous solutions of inorganic salts such as sodium chloride, carbon dioxide, oil and molten salts. Such liquids are stored in stratified layers as sources of thermal energy for heating and for refrigeration or cooling purposes. See, for example, the U.S. Pat. Nos. 4,449,368 (Haynie); 4,315,404 (Schmitt); and 4,643,212 (Rothrock).

When the lower cold layer is used for refrigeration or cooling, a stream of the cold liquid is withdrawn, used for cooling and then returned warm or hot, and at a lower density, to the top layer while cold liquid is simultaneously removed from the bottom layer. In this way, essentially the entire stored volume can be used for cooling so that the entire liquid content returned to the tank becomes heated. At an appropriate time the warm or hot liquid can be withdrawn from the tank and be cooled and then returned to the tank as a lower stratified cold layer of higher density with a hot layer of lower density on top unless, of course, cooling continues until all of the hot liquid in the tank is withdrawn and returned as cold liquid.

Maintaining the described stratification of the two liquid layers having different densities requires than the liquids be withdrawn and fed to the tank without promoting undue mixing at the tank inlet and outlet and at the interface of the two liquids. The desired result can be achieved by the use of manifolds, usually including a myriad of nozzles, ports, holes, slots, perforations or other openings, but they have been determined to be cumbersome and costly in fabrication, support, erection and maintenance.

Andrepont et al U.S. Pat. No. 4,987,922 discloses a storage tank for two liquids of different density. The tank has a lower liquid distribution plate which controls the distribution of higher density liquid, i.e. cold water, into and from the tank. The tank also has an upper liquid distribution plate which controls the distribution of lower density liquid i.e. hot water into and from the tank. While the apparatus disclosed in that patent is highly useful for the intended purpose it is not particularly adapted for normal maintenance of the tank, particularly at the bottom since it obstructs ready access to portions of the tank that require inspection and painting. Also, the particular apparatus of the patent requires considerable welding and expensive fabrication. Additionally, while the apparatus can be installed in a new tank during construction it is not easily installed in retrofitting an old tank for storing liquids of different densities because many of the pieces cannot pass through a conventional manhole having a 2 to 3 foot diameter. Accordingly, there is a need for improved apparatus for liquid distribution in a tank and for apparatus which can be fed through a tank manhole in retrofitting an old tank for storing two liquids of different density, as well as for providing ease of access for inspection and painting.

SUMMARY OF THE INVENTION

According to the invention an enclosed storage tank is provided comprising a tank shell having a bottom, a side wall and a top; a substantially horizontal first liquid distributor means located in the upper part of the tank internal space and having an upwardly facing upper liquid distribution surface; a first liquid conduit extending from outside the tank shell into communication with the upper portion of the tank to the first liquid distributor means and onto the paper liquid distribution surface; and the first liquid distributor means including a plurality of side-by-side panels positioned so that they present a substantially horizontal, flat, and smooth upper liquid distribution surface.

According to a second embodiment of the invention an enclosed storage tank is provided comprising a tank shell having a bottom, a side wall and a top; a substantially horizontal second liquid distributor means located in the lower part of the tank internal space and having a downwardly facing lower liquid distribution surface; a second liquid conduit extending from outside the tank shell into communication with the lower portion of the tank to the second liquid distributor means and to the lower liquid distribution surface; and the second liquid distributor means including a plurality of side-by-side panels positioned so that they present a substantially horizontal, flat, and smooth lower liquid distribution surface.

In a third embodiment the storage tank can contain both the first and second liquid distributor means and first and second liquid conduits.

The liquid distributor means can include at least three substantially horizontal and substantially radial ribs connected to a common center means and the plurality of side-by-side panels can be supported at least partly by the ribs. Specifically, the panels can have opposing ends supported by adjoining ribs. Also, the panels can be positioned substantially normal to a radius from the common center means.

The panels can be of uniform width for their length. Desirably, the panels are all of the same width. However, the panels can be of different length when arranged substantially normal to a radius from the common center means.

The panels can be made of metal or non-metallic material. Desirably, the material used should be corrosion resistant. Panels made of a polymeric material, such as a glass fiber or carbon fiber reinforced polymeric material are particularly useful.

Especially useful are panels in the form of channels. The first distributor means can have each channel positioned so that the trough of the channel faces downwards. Each channel can have the same width and depth. Each channel can be made of corrosion resistant material. Also, the number of channels between each pair of adjacent ribs can be identical and the general peripheral shape of the first distributor means can be essentially a regular polygon having substantially equal length sides. The second distributor means can have essentially the same structure but with the troughs of the channels facing upwards.

In regard to the first distributor means, each rib can include a web or plate extending above the distributor surface and the first liquid conduit can have an opening positioned such that it can simultaneously deliver a liquid in substantially equal amounts between each pair of adjacent webs or plates and in reverse flow can simultaneously remove a liquid in substantially equal amounts between each pair of adjacent webs or plates.

As to the second distributor means, each rib can include a web or plate extending downward of the distributor surface and the second liquid conduit can have an opening positioned such that it can simultaneously deliver a liquid in substantially equal amounts between each pair of adjacent webs or plates and in reverse flow can simultaneously remove a liquid in substantially equal amounts between each pair of adjacent webs or plates.

The first liquid conduit can include a vertical column portion which at least in part supports the first distributor means. Also, the second liquid conduit can include a vertical column portion which feeds the liquid to and from the second distributor means and which at least in part supports the second distributor means.

In a more specific embodiment of the invention an enclosed storage tank for simultaneous addition and removal, and storage, of two liquid layers of different density is provided comprising a tank shell having a bottom, a side wall extending upwardly from the bottom, a roof supported at least in part by the side wall and at least one vertical tubular column extending upwardly from the shell bottom to at least close to the roof; a substantially horizontal first liquid distributor means spaced around and extending outwardly of the column periphery; the first liquid distributor means being located in the upper part of the tank internal space and having an upwardly facing liquid distribution surface; a low density liquid conduit extending from outside the shell into communication with the column interior whereby low density liquid an be fed to the column interior and then flow out of a first opening means in the column into the upper portion of the tank to the first liquid distributor means and onto the upper liquid distribution surface and the low density liquid can be withdrawn from the tank through the first opening means and then through the low density liquid conduit; a substantially horizontal second liquid distributor means spaced around and extending outwardly of the column periphery above which the column extends and spaced above the shell bottom; the second liquid distributor means having a downwardly facing liquid distribution surface; a high density liquid conduit extending from outside the shell into communication with the column interior whereby high density liquid can be fed to the column interior and then flow out of a second opening means in the column into the lower portion of the tank to the second distributor means and beneath the lower liquid downwardly facing distribution surface and the high density liquid ca be withdrawn from the tank through the second opening means and then through the high density liquid conduit while density liquid is fed to the tank through the low density liquid conduit; the first liquid distributor means including a plurality of side-by-side panels positioned so that they present a substantially horizontal, flat, and smooth upper liquid distribution surface; and the second liquid distributor means including a plurality of side-by-side panels positioned so that they present a substantially horizontal, flat, and smooth lower liquid distribution surface.

Also provided is a method of constructing an enclosed storage tank for the storage of thermal energy in the form of two liquid layers of different density and different temperatures comprising erecting a tank shell having a bottom, a side wall and a top; connecting at least three horizontal ribs to a common center means in the upper portion of the tank; securing a plurality of panel sections to the ribs to thereby form a first liquid distributor means having a substantially horizontal, flat, and smooth upper liquid distribution surface; and providing a first liquid conduit extending from outside the tank shell into liquid communication with the first liquid distributor and th upper liquid distribution surface. All of the panels can be of uniform width and arranged in side-by-side position. The panels can have opposing ends supported by adjoining ribs. The panels can be positioned substantially normal to a radius from the common center means. The panel sections can be removably secured to the ribs so that the panels can be readily removed for servicing and replacement and to provide easy access to interior upper parts of the tank for maintenance purposes.

A method of constructing an enclosed storage tank for the storage of thermal energy in the form of two liquid layers of different density and different temperatures also is provided comprising erecting a tank shell having a bottom, a side wall and a top; connecting at least three horizontal ribs to a common center means in the lower portion of the tank; securing a plurality of panel sections to the ribs to thereby form a second liquid distributor means having a substantially horizontal, flat, and smooth lower liquid distribution surface; and providing a second liquid conduit extending from outside the tank shell into liquid communication with the second liquid distributor and the lower liquid distribution surface. All of the panels can be of uniform width and the panels can be arranged in side-by-side position. The panels can have opposing ends supported by adjoining ribs. The panels can be positioned substantially normal to a radius from the common center means. The panel sections can be removably secured to the ribs so that the panels can be readily removed for servicing and replacement and to provide easy access to interior lower parts of the tank for maintenance purposes.

A method is additionally provided by the invention for converting an existing enclosed storage tank, the original use of which was any of various uses, for the storage of thermal energy in the form of two liquid layers of different density and different temperatures comprising a tank shell having a bottom, a side wall and a top and at least one manhole which provides access to the tank interior from the outside comprising feeding the components of a first liquid distributor through one or more manholes into the tank interior, said components including at least three ribs and a plurality of panel sections; positioning the ribs connected to a common center means in the upper portion of the tank; positioning a plurality of panel sections supported by the ribs to thereby form a first liquid distributor means having a substantially horizontal, flat, and smooth upper liquid distribution surface; and providing a first liquid conduit extending from outside the tank shell into liquid communication with the first liquid distributor and the upper distribution surface. The panel sections can be removably secured to the ribs so that the panels can be readily removed for servicing and replacement and to provide easy access to interior upper parts of the tank for maintenance purposes.

A method of converting an existing enclosed storage tank, the original use of which was any of various uses, for the storage of thermal energy in the form of two liquid layers of different density and different temperatures comprising a tank shell having a bottom, a side wall and a top and at least one manhole which provides access to the tank interior from the outside, is also provided comprising feeding the components of a second liquid distributor through one or more manholes into the tank interior, said components including at least three ribs and a plurality of panel sections; positioning the ribs connected to a common center means in the lower portion of the tank; positioning a plurality of panel sections supported by the ribs to thereby form a second liquid distributor having a substantially horizontal, flat, and smooth lower liquid distribution surface; and providing a second liquid conduit extending from outside the tank shell into liquid communication with the second liquid distributor and the lower distribution surface. The panel sections can be removably secured to the ribs so that the panels can be readily removed for servicing and replacement and to provide easy access to interior lower parts of the tank for maintenance purposes.

BRIEF DESCRIPTION OF THE DRAWINGS

FIG. 3 is a plan view of the first or upper liquid distributor;

FIG. 4 is a bottom view of the liquid distributor shown in FIG. 3;

FIG. 5 is an enlarged sectional view of a portion of the first or upper liquid distributor shown in FIG. 2;

FIG. 6 is an enlarged sectional view of the panels in the first or upper liquid distributor shown in FIGS. 2 and 5;

FIG. 7 is an enlarged end view taken along the line 7—7 of the rib in the first or upper liquid distributor shown in FIG. 3;

FIG. 8 is a side elevational view of a unitary plate for producing two radial opposing ribs in the first or upper liquid distributor;

FIG. 9 is a side elevational view of a plate forming part of a radial rib in the first or upper liquid distributor;

FIG. 10 is a partial sectional view taken along the line 10—10 of FIG. 2 with the plate 74 broken away in the form of a hole to show that the six ribs join at a common center and are spaced apart 60°;

FIG. 11 is an enlarged sectional view of a portion of the second or lower liquid distributor shown in FIG. 2;

FIG. 12 is an enlarged end view taken along the line 12—12 of the rib in the second or lower liquid distributor shown in FIG. 11;

FIG. 13 is a side elevational view of a unitary plate for producing two radial opposing ribs in the second or lower liquid distributor shown in FIG. 2;

FIG. 14 is a side elevational view of a plate forming part of a radial rib in the second or lower liquid distributor;

FIG. 15 is an end view of three adjacent channel sections (identical in cross section but different in length) of a second type which can be used in lieu of those shown in FIG. 6 in the first and second distributors;

FIG. 16 is an end view of three adjacent channel sections of a third type which can be used in lieu of those shown in FIGS. 6 and 15 in the first and second distributors; and FIG. 17 is an end view of three adjacent channel sections of a fourth type which can be used in lieu of those shown in FIGS. 6, 15 and 16 in the first and second distributors.

DETAILED DESCRIPTION OF THE DRAWINGS

To the extent it is reasonable and practical the same or similar elements which appear in the various drawing figures will be identified by the same numbers.

Figure 1:
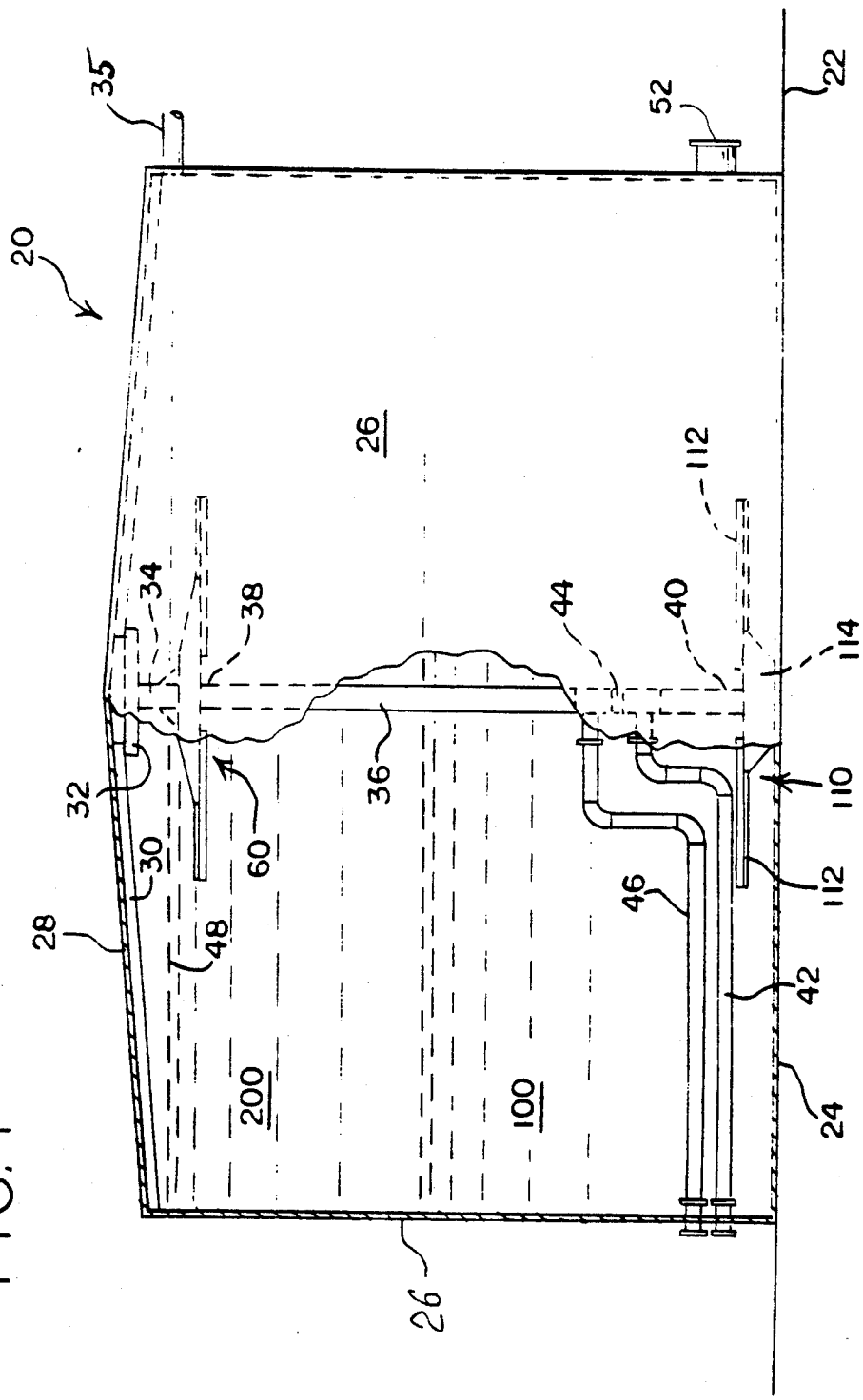
FIG. 1 is a side elevational view, partially broken away and in section, of one embodiment of a storage tank provided by the invention.

FIG. 1 illustrates an enclosed storage tank 20 supported on a foundation or ground 22. The tank has a flat circular metal bottom 24, a circular cylindrical side wall 26 and a conical roof 28 which is supported by beams 30 which have their inner ends supported by ring 32 on the upper portion of a stub column 34. An overflow outlet pipe 35 is positioned in the top of said wall 26 slightly above the maximum liquid storage capacity of the tank. Manhole 52 (FIG. 1) provides access into the tank and it can be used to feed parts into the tank as will be explained subsequently.

The vertical axially positioned column 36 is mounted in the center of the tank 24. The column 36 is a vertical hollow tube which is circular in horizontal section. The open upper end 38 of column 36 supports a first or upper liquid distributor 60 which in turn supports the stub column 34.

Pipe 42 extends from outside of tank side wall 26 into liquid communication with the interior lower part of column 36 below baffle plate 44 which extends completely across the interior horizontal area of the column and thereby prevents flow of liquid upward past the baffle plate 44. High density liquid fed by pipe 42 into the lower part of column 36 flows out of the column open lower end 40 below the second horizontal liquid distributor 110.

The removal of high density liquid 100 from tank 20 is achieved by having it flow into the lower open end of column 36 and into pipe 42. Thus, pipe 42 functions as an inlet pipe and an outlet pipe for high density liquid.

Pipe 46 extends from outside of tank 20 into liquid communication with the interior part of column 36 above baffle 44. Pipe 46 is used to feed lower density liquid into, and withdraw it from, the tank 20. When lower density liquid 200 is fed by pipe 46 into column 36 the liquid flows upwardly in the column until it reaches the upper open end 38 of column 36. The lower density liquid 200 flows out of the column open end 38 into the upper space of the tank but above the first or upper horizontal liquid distributor 60.

To increase the stored volume of a higher density liquid 100, which can be cold water, in tank 20 the higher density liquid can be fed into the tank through pipe 42. Simultaneously, an equal volume of a lower density liquid 200, which can be hot water, can be removed from the tank 20 through pipe 46 while the nominal maximum liquid capacity of the tank is maintained at a level 48 located at or slightly below overflow outlet pipe 35. By reversing the described procedure the volume of lower density water 200 in the tank can be increased.

The described embodiment of the invention uses the column 36 as the liquid riser or fluid conduit for the inlet and outlet flow of liquid to and from the liquid distributors 60,110. This arrangement uses less material and is more economical to fabricate and erect than others which might be used. Another advantage of the column 36 is that it simultaneously serves to support roof 28. Furthermore, the primary liquid flow side or surface of each of the distributors 60,110 is essentially continuous, planar, flat and smooth, thus permitting the non-turbulent radial liquid flow desired for optimum liquid distribution.

For insulation purposes the tank bottom 24 side wall 26 and roof 28 can be externally or internally insulated. The column 36 can be similarly insulated as can the internal flow conduits 42 and 46, as well as baffle 44. Baffle 44, if desired, can constitute two horizontal vertically spaced apart plates to thereby obtain an insulating effect. Furthermore, the tank and all other elements therein can be made wholly or partially of non-metallic materials such as polypropylene, polyvinylchloride or of a composite glass fiber-containing solid polymeric material.

The tank 20 is especially useful for thermal energy storage of liquid which changes density with change in temperature, such as water, salt water, natural or synthetic oils, molten salts, carbon dioxide, lower alcohols such a methanol and ethanol, liquefied natural gas, liquid hydrocarbons and liquid metals in pure form or as mixtures. The tank 20 is also useful for storing two chemically different liquids having different densities. In both cases, however, the liquid volumes remain separated by stratification with the lower density liquid volume stratified on top of the higher density liquid volume.

FIGS. 2 to 10 illustrate details of the first or upper liquid distributor 60. As shown in FIGS. 3 and 4, the liquid distributor 60 has six horizontal radial ribs 62 positioned so that each two adjacent ribs are angled 60° from each other and intersecting at the center of the open upper end 38 of column 36. All six of the ribs 62 are centrally positioned above the top end of column 36. Two radially opposed ribs 62 are formed from a single vertical plate 64 (FIG. 8) while the other four ribs 62 are formed from vertical plate 66 as shown in FIG. 9. The inner vertical edges 68 of plates 66 are welded to the vertical center line of plate 64 at a 60° angle to thereby form the spider-like structure shown, in part, in FIG. 10.

Hexagonal plate 70 fits in the recessed areas 72 of plates 64,66. Each corner of plate 70 is positioned to be directly beneath a respective web or plate 64,66 thereby placing each straight side of the hexagonal plate 70 between adjacent ribs 62. The plate 70 is connected to the vertical plates 64,66 and to the top of column 36. Vertical gusset plates 73 are joined to plate 70 and column 36 to further strengthen the connection of the plate 70 to the column 36.

Hexagonal plate 70 has a central circular hole slightly larger than the internal diameter of column 36 so that liquid can readily flow into and out of the column through said hole. The direction of the horizontal flow of the liquid is guided and controlled by the plates 64,66 which divide the liquid into six essentially equal portions.

Figure 2:
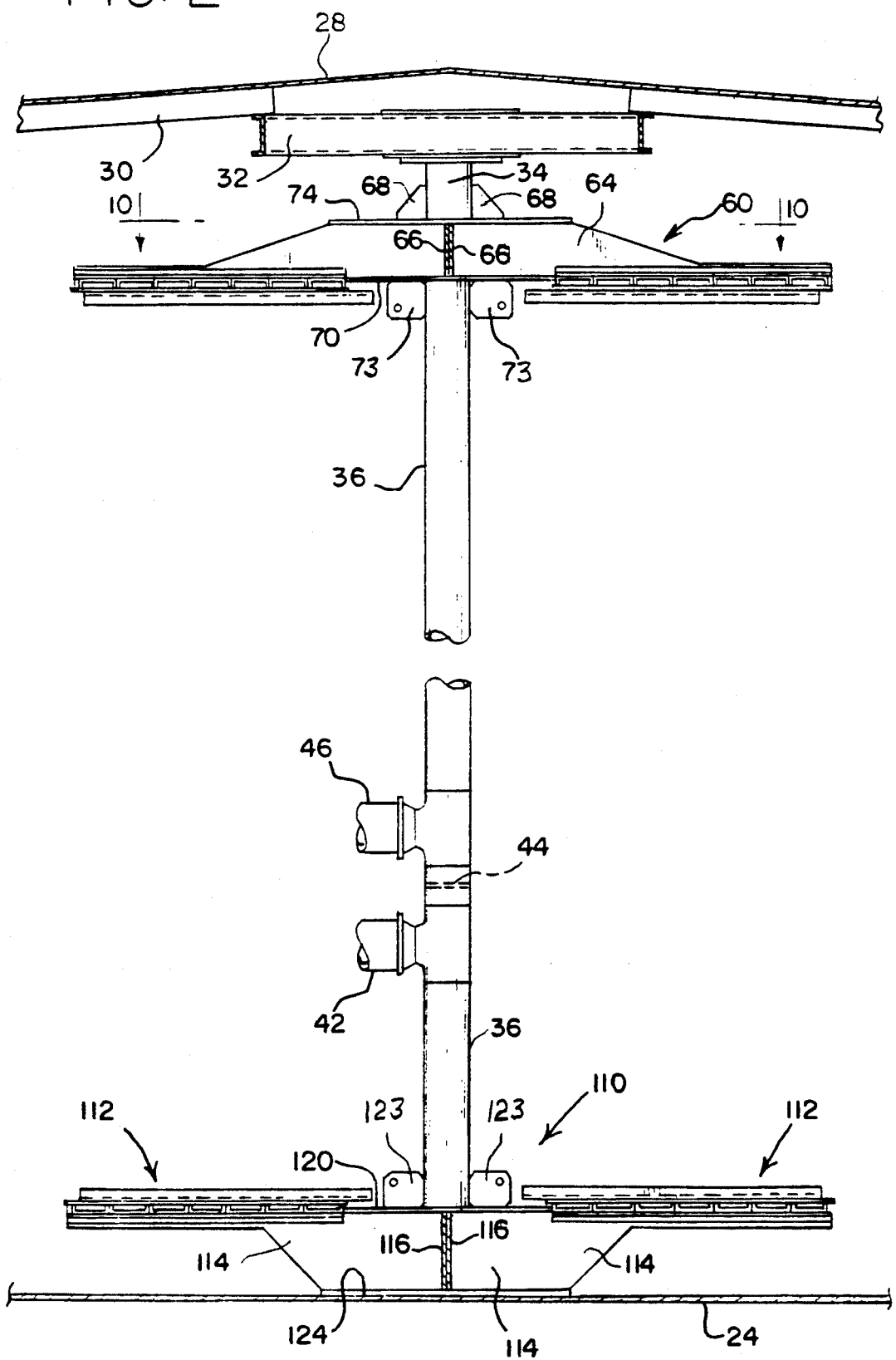
FIG. 2 is an enlarged elevational view, partially in section, of the central portion of the storage tank shown in FIG. 2.

A circular horizontal flat plate 74 is axially positioned on and joined to the top of the vertical plates 64,66. The plate 74 functions as a splash plate and prevents liquid from flowing out of the open upper end 38 of column 36 from creating undue turbulence. Plate 74 also provides a support for the lower end of stub column 34. Six radially positioned equally spaced apart gusset plates 68 ar joined to plate 74 and stub column 34 to strengthen the connection of these elements together (FIG. 2).

As shown in FIGS. 5 and 7, besides a vertical plate 64 or 66 each rib 62 includes a pair of opposing angle bars 76,78 which are connected to plate 64 or 66. A long horizontal plate 80 is connected to the lower edge of plates 64 and 66.

A series of side-by-side panels in the form of channel members 82 (FIGS. 5 to 7) are supported by two adjacent ribs 62 by placing the ends of the channels between the horizontal flange of an angle 76,78 and the plate 80. The channel members 82 are identical in cross section size and shape but are of increasing lengths and with the ends cut at inwardly slanted 60° angles so that the ends abut the respective plates 64,66. The troughs 84 of the channel members 82 face downward thereby positioning the smooth flat surface of the channel members upward so that the adjoining faces form a substantially continuous planar, horizontal, flat, smooth surface over which the liquid can flow in either radial direction. Since the ribs are set at 60° angles from each other, one-sixth of the liquid flow to and from the column open end 38 will occur between each pair of adjacent ribs (FIG. 10).

The channel members 82 can be made of metal but desirably are made of non-metallic material such as a composite polymeric material, especially glass fiber reinforced polystyrene or other rigid polymeric material. Other parts of the distributor 60 can be made of polymeric material as is considered appropriate.

The first or upper distributor 60 has seven channel member 82 sections positioned side-by-side between and supported by each adjacent two ribs 62. The ends of the channel members 82 can be connected to the ribs 62 by removable pins 88 so that the distributor 60 can be largely dismantled readily for repair, servicing of the tank and replacement of parts. It is usually unnecessary, however, to attach each end of each channel to a rib. Thus, after the channel members 82 are installed between each pair of ribs 62, the last or outermost channel member 82, between each pair of ribs, is connected to the ends of angle members 76, 78, desirably by removable pins 88. The outer angle members 86 stiffen the first distributor 60 in that each angle member 86 is connected to the ends of a pair of adjacent ribs 62.

All of the described elements or parts of the distributor 60 can be introduced into the tank through manhole 52 when a tank previously used for some other purpose is to retrofitted to store a liquid as previously described.

Turning now to the second or lower liquid distributor 110 it will be seen that it is substantially a mirror image of the first or upper liquid distributor 60. Even so, the second distributor 110 will be described in further detail for completeness.

FIGS. 1, 2 and 11 to 14 illustrate details of the second or lower liquid distributor 110. The second liquid distributor 110 has six horizontal radial ribs 112 positioned so that each two adjacent ribs are angled 60° from each other and from the center of the open lower end 40 of column 36. These ribs 112 are positioned essentially like the ribs 62 of the first or upper distributor but as mirror images thereof. All six of the ribs 112 are centrally positioned below the lower end of column 36. Two radially opposed ribs 112 are formed from a single vertical plate 114 (FIG. 13) while the other four ribs 112 are formed from vertical plate 116 as shown in FIG. 14. The inner vertical edges 118 of plates 116 are welded to the vertical center line of plate 114 at a 60° angle to thereby form a spider-like structure like that shown in FIG. 10 for the first distributor.

Hexagonal plate 120, like plate 70, fits in the recessed areas 122 of plates 114,116. Each corner of plate 20 is positioned to be directly above a respective plate 114,116 thereby placing each straight side of the hexagonal plate 120 between adjacent ribs 112. The plate 120 is connected to the vertical plates 114,116 and to the bottom of column 36. Vertical gusset plates 123 are joined to plate 120 and column 36 to further strengthen the connection of the plate 120 to the column 36.

Hexagonal plate 120 has a central circular hole slightly larger than the internal diameter of column 36 so that liquid can readily flow into and out of the column through said hole. The direction of the horizontal flow of the liquid is guided and controlled by the plates 114,116 which divide the liquid into six essentially equal portions.

A circular horizontal flat plate 124 is axially positioned on and joined to the bottom of the vertical plates 114,116. The plate 124 is in direct contact with the tank bottom 24 and thus provides support for the first or lower distributor as well as for column 36.

As shown in FIGS. 11 and 12, in addition to vertical plate 114 or 116, each rib 112 includes a pair of opposing angle bars 126,128 which are connected to plate 114,116. A long horizontal plate 130 is connected to the upper edge of plates 114 and 116.

A series of side-by-side panels in the form of channel members 182 (FIGS. 2 and 11) are supported by two adjacent ribs 112 by placing the ends of the channel members 182 between the horizontal flange of an angle bar 126,128 and the plate 130. The channel members 182 are identical in cross-section size and shape but are of increasing lengths and with the ends cut at inwardly directed 60° angles so that the ends abut the respective plates 114,116 The troughs 184 of the channel members 182 face upward thereby positioning the smooth flat surface of the channel members downward so that the adjoining faces form a continuous planar, horizontal, flat, and smooth surface over which the liquid can flow in either radial direction. Since the ribs 112 are set at 60° angles from each other, one-sixth of the horizontal liquid flow to and from the column open end 40 will occur between each pair of adjacent ribs.

The channel members 182 can be made of metal but desirably are made of non-metallic material such as a composite polymeric material, especially glass fiber reinforced polystyrene or some other rigid polymeric material. Other parts of the distributor 110 can be made of polymeric material as is considered appropriate.

The second or lower distributor 110 has seven channel member sections 182 positioned side-by-side between and supported by each adjacent two ribs 112. The ends of the channel members 182 can be connected to the ribs 112 by removable pins 88 so that the distributor 110 can be largely dismantled readily for repair, servicing of the tank and replacement of parts. It is usually unnecessary, however, to attach each end of each channel to a rib. Thus, after the channel members 182 are installed between each pair of ribs 112 the last, or outermost, channel member 182 between each pair of ribs is connected to the ends of angle members 126,128, desirably by removable pins 88. The outer angle members 186 serve to stiffen the distributor 110 in that each angle member 186 is connected to the ends of a pair of adjacent ribs 112.

Since the first and second distributors 60,110 are mirror images of each other most of the respective parts used in each are interchangeable with the other. Furthermore, the panel sections used in each row between each two adjacent ribs in each distributor 60,110 are of the same size and shape so that it is unnecessary to fabricate or cut each piece to a separate nonrepetitive dimension. Specifically, when a distributor has six ribs and seven panel sections are installed side by-side between each two adjacent ribs a total of forty-two panel sections need be prepared but there will be six identical panels of only seven different sizes.

Although the drawings illustrate first and second distributors each with six ribs, it is within the scope of the invention for the distributors to have at least three ribs. The maximum number of ribs will depend on the size of the tank but generally the maximum number of ribs will be twelve. Depending on the number of ribs, the distributors can be triangular, square, pentagonal, hexagonal, heptagonal, octagonal, etc. Additionally, the first and second distributors can have the same or a different number of ribs.

FIGS. 15 to 17 illustrate additional forms of channel members which ca be used in the distributors.

The channel 201 shown in FIG. 15 has a flat surface 202, a vertical flange 204,206 at each side and an inwardly directed web 208,210 connected to a respective side.

The channel 220 shown in FIG. 16 is similar to the channel 201 shown in FIG. 15. However, the web 222 is bent outwardly rather than inwardly as is the web 210 in channel 201. The channel 220 provides a structure which is self-aligning in that the side edges of adjacent channels overlap and thus provide a uniform, planar and horizontal, flat and smooth surface. Also, the overlapping portions can be tied together by means of vertical removable pins 87 which can extend through both channels.

The channel 230 shown in FIG. 17 is similar to channel 220 shown in FIG. 16. However, channel 230 is shown with an upwardly directed edge rib 232 which engages the outer edge of web 208 of an adjoining panel and thereby horizontally interlocks the two panels together when they are also restrained against vertical displacement, such as by the structure of ribs 62,112. Edge rib 232 can be eliminated, if desired, and the panel used in essentially the same way in fabricating the liquid distributors.

While the channel members illustrated in the drawings have essentially vertical sides, other channel members with slanted or sloped sides, or even arced sides, can be used although the adjoining sides of adjacent panels desirably should be complementary or shaped to nest together.

Even though channel members are the presently preferred structure for the panels, the panels can have other shapes. Thus, they can be solid boards having uniform thickness with squared edges, ship lath edges or tongue and groove edges. The panels can also be made of lightweight rigid polymeric foam.

The foregoing detailed description has been given for clearness of understanding only, and no unnecessary limitations should be understood therefrom, as modifications will be obvious to those skilled in the art.

What is claimed is:

1. An enclosed storage tank comprising:
   a tank shell having a bottom, a side wall and a top;
   a substantially horizontal first liquid distributor means located in the upper part of the tank internal space and having an upwardly facing liquid distribution surface;
   a first liquid conduit extending from outside the tank shell into communication with the upper portion of the tank to the first liquid distributor means and onto the upwardly facing liquid distribution surface;
   the first liquid distributor means including at least three substantially horizontal and substantially radial ribs connected to a common center means;
   a plurality of side-by-side panels supported at least partly by the ribs and positioned so that they present a substantially horizontal, flat, and smooth upwardly facing liquid distribution surface; and
   the panels being substantially normal to a radius from the common center means.

2. A storage tank according to claim 1 in which:
   all of the panels are of uniform width.

3. A storage tank according to claim 1 in which:
   the panels have opposing ends supported by adjoining ribs.

4. An enclosed storage tank according to claim 3 in which:
   each rib includes a web extending above the distributor surface; and
   the first liquid conduit has an opening positioned such that it can simultaneously deliver a liquid in substantially equal amounts between each pair of adjacent webs and in reverse flow can simultaneously remove a liquid in substantially equal amounts between each pair of adjacent webs.

5. A storage tank according to claim 1 in which:
   the panels are made of corrosion resistant material.

6. A storage tank according to claim 1 in which:
   each panel is a channel positioned so that the trough of the channel faces downwardly, each channel has the same width and depth, each channel is made of corrosion resistant material, the number of channels between each pair of adjacent ribs is identical and the general peripheral shape of the first distributor means is essentially a regular polygon having substantially equal length sides.

7. An enclosed storage tank according to claim 1 in which adjoining panels have portions which overlap each other, interlock with each other or self-align with each other.

8. An enclosed storage tank for simultaneous addition and removal, and storage, of two liquid layers of different density comprising:
   a tank shell having a bottom, a said wall extending upwardly from the bottom, a roof supported at least in part by the side wall and at least one vertical tubular column extending upwardly from the shell bottom to at least close to the roof;
   a substantially horizontal first liquid distributor means spaced around and extending outwardly of the column periphery;
   the first liquid distributor means being located in the upper part of the tank internal space and having an upwardly facing liquid distribution surface;
   a low density liquid conduit extending from outside the shell into communication with the column interior whereby low density liquid can be fed to the column interior and then flow out of a first opening means in the column into the upper portion of the tank to the first liquid distributor means and onto the upper liquid distribution surface and the low density liquid can be withdrawn from the tank through the fist opening means and then through the low density liquid conduit;
   a substantially horizontal second liquid distributor means spaced around and extending outwardly of the column periphery above which the column extends and spaced above the shell bottom;
   the second liquid distributor means having a downwardly facing liquid distribution surface;
   a high density liquid conduit extending from outside the shell into communication with the column interior whereby high density liquid can be fed to the column interior and then flow out of a second opening means in the column into the lower portions of the tank to the second distributor means and beneath the lower liquid downwardly facing distribution surface and the high density liquid can be withdrawn from the tank through the second opening means and then through the high density liquid conduit while low density liquid is fed to the tank through the low density liquid conduit;
   the first liquid distributor means including at least three substantially horizontal and substantially radial ribs supported by the column;
   a plurality of side-by-side panels supported at least partly by the ribs and positioned so that they present a substantially horizontal, flat, and smooth upper liquid distribution surface;
   the panels being substantially normal to a radius from the column; and
   the second liquid distributor means including a plurality of side-by-side panels positioned so that they present a substantially horizontal, flat, and smooth lower liquid distribution surface.

9. A storage tank according to claim 8 in which:
   the panels have opposing ends supported by adjoining ribs.

10. An enclosed storage tank according to claim 9, in which:
    each rib includes a web extending upward of the distributor surface; and
    the first liquid conduit has an opening positioned such that it can simultaneously deliver a liquid in substantially equal amounts between each pair of adjacent webs and in reverse flow can simultaneously remove a liquid in substantially equal amounts between each pair of adjacent webs.

11. A storage tank according to claim 8 in which:
    the panels are made of corrosion resistant material.

12. A storage tank according to claim 8 in which:

all of the panels are of uniform width.

13. A storage tank according to claim 8 in which:
each panel is a channel positioned so that the trough of the channel faces downwardly, each channel has the same width and depth, each channel is made of corrosion resistant material, the number of channels between each pair of adjacent ribs is identical and the general peripheral shape of the distributor means is essentially regular polygon having substantially equal length sides.

14. An enclosed storage tank for simultaneous addition and removal, and storage, of two liquid layers of different density comprising:
a tank shell having a bottom, a side wall extending upwardly from the bottom, a roof supported at least in part by the side wall and at least one vertical tubular column extending upwardly from the shell bottom to at least close to the roof;
a substantially horizontal first liquid distributor means spaced around and extending outwardly of the column periphery.
the first liquid distributor means being located in the upper part of the tank internal space and having an upwardly facing liquid distribution surface;
a low density liquid conduit extending from outside the shell into communication with the column interior whereby low density liquid can be fed to the column interior and then flow out of a first opening means in the column into the upper portion of the tank to the first liquid distributor mean and onto the upper liquid distribution surface and the low density liquid can be withdrawn from the tank through the first opening means and then through the low density liquid conduit;
a substantially horizontal second liquid distributor means spaced around and extending outwardly of the column periphery above which the column extends and spaced above the shell bottom;
the second liquid distributor means having a downwardly facing liquid distribution surface;
a high density liquid conduit extending from outside the shell into communication with the column interior whereby high density liquid can be fed to the column interior and then flow out of a second opening means in the column into the lower portion of the tank to the second distributor mean and beneath the lower liquid downwardly facing distribution surface and the high density liquid can be withdrawn from the tank through the second opening means and then through the high density liquid conduit while low density liquid is fed to the tank through the low density liquid conduit;
the first liquid distributor means including a plurality of side-by-side panels positioned so that hey present a substantially horizontal, flat, and smooth upper liquid distribution surface;
the second liquid distributor means includes at least three substantially horizontal and substantially radial ribs supported by the column;
a plurality of side-by-side panels supported at least partly by the ribs and positioned so that they present a substantially horizontal, flat, and smooth lower liquid distribution surface; and
the panels being substantially normal to a radius from the column.

15. A storage tank according to claim 14 in which:
the panels have opposing ends supported by adjoining ribs.

16. An enclosed storage tank according to claim 15 in which:
each rib includes a web extending below the distributor surface; and
the second liquid conduit has an opening positioned such that it can simultaneously deliver a liquid in substantially equal amounts between each pair of adjacent webs and in reverse flow can simultaneously remove a liquid in substantially equal amounts between each pair of adjacent webs.

17. A storage tank according to claim 14 in which:
the panels are made of corrosion resistant material.

18. A storage tank according to claim 14 in which:
each panels is a channel positioned so that the trough of the channel faces upwardly, each channel has the same width and depth, each channel is made of corrosion resistant material, the number of channels between each pair of adjacent ribs is identical and the general peripheral shape of the distributor means is essentially a regular polygon having substantially equal length sides.

19. A method of constructing an enclosed storage tank for the storage of thermal energy in the form of two liquid layers of different density and different temperatures comprising:
erecting a tank shell having a bottom, a side wall and a top;
connecting at least three horizontal ribs to a common center means in the upper portion of the tank;
securing a plurality of panels of uniform width and having opposing ends to the ribs in side-by-side position and supporting the panel opposing ends by adjoining ribs to thereby form a first liquid distributor means having a substantially horizontal, flat, and smooth upper liquid distribution surface; and
providing a first liquid conduit extending from outside the tank shell into liquid communication with the first liquid distributor and the upper distribution surface.

20. A method according to claim 19 including:
positioning the panels substantially normal to a radius from the common center means.

21. A method according to claim 19 in which adjoining panels have portions which overlap each other, interlock with each other self-align with each other.

22. An enclosed storage tank comprising:
a tank shell having a bottom, a side wall and a top;
a substantially horizontal liquid distributor means located in the lower part of the tank internal space and having a downwardly facing liquid distribution surface;
a liquid conduit extending from outside the tank shell into communication with the lower portion of the tank to the liquid distributor means and to the lower liquid distribution surface;
the liquid distributor means including at least three substantially horizontal and substantially radial ribs connected to a common center means;
a plurality of side-by-side panels supported at least partly by the ribs and positioned so that they present a substantially horizontal, flat, and smooth lower liquid distribution surface; and
the panels being substantially normal to a radius from the common center means.

23. A storage tank according to claim 22 in which:
all of the panels are of uniform width.

24. A storage tank according to claim 22 in which:

the panels have opposing ends supported by adjoining ribs.

25. An enclosed storage tank according to claim 24 in which:
   each rib includes a web extending downwardly of the distributor surface; and
   the liquid conduit has an opening positioned such that it can simultaneously deliver a liquid in substantially equal amounts between each pair of adjacent webs and in reverse flow can simultaneously remove a liquid in substantially equal amounts between each pair of adjacent webs.

26. A storage tank according to claim 22 in which:
   the panels are made of corrosion resistant material.

27. A storage tank according to claim 22 in which:
   each panel is a channel positioned so that the trough of the channel faces upwardly, each channel has the same width and depth, each channel is made of corrosion resistant material, the number of channels between each pair of adjacent ribs is identical and the general peripheral shape of the distributor means is substantially a regular polygon having substantially equal length sides.

28. An enclosed storage tank according to claim 22 in which adjoining panels have portions which overlap each other, interlock with each other or self-align with each other.

29. A method of constructing an enclosed storage tank for the storage of thermal energy in the form of two liquid layers of different density and different temperatures comprising:
   erecting a tank shell having a bottom, a side wall and a top;
   connecting at least three horizontal ribs to a common center means in the lower portion of the tank
   securing a plurality of panels of uniform width and having opposing ends so that the panel opposing ends are supported by adjoining ribs with the panels arranged in side-by-side position to thereby form a liquid distributor means having a substantially horizontal, flat, and smooth lower liquid distribution surface; and
   providing a liquid conduit extending from outside the tank shell into liquid communication with the liquid distributor and the lower distribution surface.

30. A method according to claim 29 including:
   positioning the panels substantially normal to a radius from the common center means.

31. A method according to claim 29 in which adjoining panels have portions which overlap each other, interlock with each other or self-align with each other.

32. An enclosed storage tank comprising:
   a tank shell having a bottom, a side wall and a top;
   a substantially horizontal first liquid distributor means located in the upper part of the tank internal space and having an upwardly facing liquid distribution surface;
   a first liquid conduit extending from outside the tank shell into communication with the upper portion of the tank to the first liquid distributor means and onto the upper liquid distribution surface;
   the first liquid distributor means comprising a plurality of horizontal sections having radial sides of equal length;
   each horizontal section comprising a plurality of panels having opposing parallel sides which are substantially normal to a radius from a common center means; and
   the panels of each section being positioned side-by-side so that the panels present a substantially horizontal, flat, and smooth upper liquid distribution surface.

33. A storage tank according to claim 32 in which:
   the general peripheral shape of the distributor means is essentially a regular polygon having substantially equal length sides.

34. An enclosed storage tank comprising:
   a tank shell having a bottom, a side wall and a top;
   a substantially horizontal liquid distributor means located in the lower part of the tank internal space and having a downwardly facing liquid distribution surface;
   a second liquid conduit extending from outside the tank shell into communication with the lower portion of the tank to the liquid distributor means and to the lower liquid distribution surface; and
   the liquid distributor means comprising a plurality of horizontal sections having radial sides of equal length;
   each horizontal section comprising a plurality of panels having opposing parallel sides which are substantially normal to a radius from a common center means; and
   the panels of each section being positioned side-by-side so that they present a substantially horizontal, flat, and smooth lower liquid distribution surface.

35. A storage tank according to claim 34 in which:
   the general peripheral shape of the distributor means is essentially a regular polygon having substantially equal length sides.

* * * * *